(12) United States Patent
Mullins et al.

(10) Patent No.: US 9,873,448 B2
(45) Date of Patent: Jan. 23, 2018

(54) END OF TRAVEL STOP

(71) Applicant: Steering Solutions IP Holding Corporation, Saginaw, MI (US)

(72) Inventors: Joshua D. Mullins, Bay City, MI (US); James J. Shavrnoch, Frankenmuth, MI (US); Andrey A. Sergeyev, Houghton, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 311 days.

(21) Appl. No.: 14/263,111

(22) Filed: Apr. 28, 2014

(65) Prior Publication Data

US 2015/0274190 A1    Oct. 1, 2015

Related U.S. Application Data

(60) Provisional application No. 61/972,686, filed on Mar. 31, 2014.

(51) Int. Cl.
*B62D 3/12* (2006.01)
*F16H 55/26* (2006.01)

(52) U.S. Cl.
CPC .............. *B62D 3/12* (2013.01); *F16H 55/26* (2013.01); *Y10T 74/1967* (2015.01); *Y10T 74/20636* (2015.01)

(58) Field of Classification Search
CPC . B62D 1/11; B62D 3/12; B62D 7/228; B62D 21/15; F16H 55/26; Y10T 74/1967

USPC ..... 74/422, 388 PS; 180/427, 428, 437, 444; 280/86.756, 124.176, 93.511, 93.514, 280/93.515; 403/120, 123, 132
See application file for complete search history.

(56) References Cited

U.S. PATENT DOCUMENTS

| | | | | |
|---|---|---|---|---|
| 5,694,810 A | * | 12/1997 | Iwasa | B62D 5/12 74/109 |
| 5,704,726 A | * | 1/1998 | Nemoto | B62D 7/16 403/132 |
| 6,481,732 B1 | * | 11/2002 | Hawkins | B60G 17/0162 280/124.106 |
| 6,485,180 B2 | * | 11/2002 | Mena | B62D 3/12 384/215 |
| 6,520,520 B2 | * | 2/2003 | Howard | B62D 7/22 180/421 |
| 6,530,585 B1 | * | 3/2003 | Howard | B62D 6/04 280/89.11 |
| 6,698,777 B1 | * | 3/2004 | Shepherd | B62D 6/04 180/421 |
| 6,817,620 B1 | * | 11/2004 | Howard | B62D 7/228 280/89.11 |

(Continued)

*Primary Examiner* — Terence Boes
*Assistant Examiner* — Leonard J Archuleta
(74) *Attorney, Agent, or Firm* — Cantor Colburn LLP

(57) ABSTRACT

In an embodiment of the invention, an end of travel stop is provided for a steering gear assembly having a housing, a rack, and a tie rod. The end of travel stop includes an annular body comprising a plurality of segments defining a first crenellated side of the annular body and a second crenellated side of the annular body. The stop is circumscribed over the rack and is oriented between the housing and the tie rod, and is configured to absorb an impact force transferred through the tie rod and to prevent overtravel of the rack.

13 Claims, 2 Drawing Sheets

(56) References Cited

U.S. PATENT DOCUMENTS

| | | | |
|---|---|---|---|
| 7,118,118 B1* | 10/2006 | Howard | B62D 6/04 280/89.11 |
| 7,207,580 B2* | 4/2007 | Howard | B62D 7/228 280/89.11 |
| 7,219,908 B1* | 5/2007 | Howard | B62D 6/04 280/89.11 |
| 7,220,056 B2* | 5/2007 | Kubota | B62D 1/16 384/215 |
| 7,401,789 B2* | 7/2008 | Harer | B62D 5/22 180/428 |
| 7,665,747 B2* | 2/2010 | Arlt | B62D 3/12 280/93.514 |
| 7,806,419 B1* | 10/2010 | Howard | B62D 6/04 280/89.11 |
| 8,127,639 B2* | 3/2012 | Manwaring | F16C 33/201 280/777 |
| 8,272,785 B2* | 9/2012 | Hirose | B62D 3/12 384/215 |
| 8,429,991 B2* | 4/2013 | Kim | B62D 3/12 180/427 |
| 8,555,741 B2 | 10/2013 | Arlt et al. | |
| 8,662,509 B2* | 3/2014 | Shiraishi | B62D 3/12 180/444 |
| 8,925,939 B2* | 1/2015 | Ohashi | B62D 3/12 280/93.514 |
| 9,279,450 B2* | 3/2016 | Zaike | F16C 27/063 |
| 9,302,697 B2* | 4/2016 | Ohashi | B62D 7/163 |
| 9,409,267 B2* | 8/2016 | Plantan | B23P 19/084 |
| 9,428,216 B2* | 8/2016 | Kawakubo | B62D 3/126 |
| 2008/0088104 A1* | 4/2008 | Arlt | B62D 3/12 280/93.514 |
| 2010/0251839 A1* | 10/2010 | Kim | B62D 3/12 74/29 |
| 2011/0303480 A1* | 12/2011 | Shimizu | B62D 1/16 180/444 |
| 2014/0034410 A1 | 2/2014 | Jackson et al. | |
| 2014/0056549 A1* | 2/2014 | Sandey | B62D 3/12 384/441 |
| 2016/0061256 A1* | 3/2016 | Nakagawa | F16C 17/02 384/297 |
| 2016/0146262 A1* | 5/2016 | Kogure | F16D 3/12 180/444 |

* cited by examiner

END OF TRAVEL STOP

CROSS-REFERENCE TO RELATED APPLICATION

This patent application claims priority to U.S. Provisional Patent Application Ser. No. 61/972686, filed Mar. 31, 2014 which is incorporated herein by reference in its entirety.

FIELD OF THE INVENTION

The following description relates to steering gear assemblies and, more particularly, to end of travel devices for steering gear assemblies.

BACKGROUND

Some known steering gear assemblies include a housing, a rack gear, and a tie rod. In an impact event (e.g., a vehicle striking a curb or other obstruction), the rack gear may be suddenly loaded. This may force a tie rod end into the end of the housing and may cause overtravel of the rack gear. This impact event may cause damage or failure to the steering gear assembly.

Accordingly, it is desirable to provide an end of travel stop to absorb an impact event force and to facilitate preventing overtravel of the gear.

SUMMARY OF THE INVENTION

In an embodiment of the invention, an end of travel stop is provided for a steering gear assembly having a housing, a rack, and a tie rod. The end of travel stop includes an annular body comprising a plurality of segments defining a first crenellated side of the annular body and a second crenellated side of the annular body. The stop is circumscribed over the rack and is oriented between the housing and the tie rod, and is configured to absorb an impact force transferred through the tie rod and to prevent overtravel of the rack.

In another embodiment of the invention, a steering gear assembly is provided. The steering gear assembly includes a housing, a rack received within the housing, a tie rod coupled to the rack, and an end of travel stop circumscribed over the rack and oriented between the housing and the tie rod. The end of travel stop includes an annular body comprising a plurality of segments defining a first crenellated side of the annular body and a second crenellated side of the annular body.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
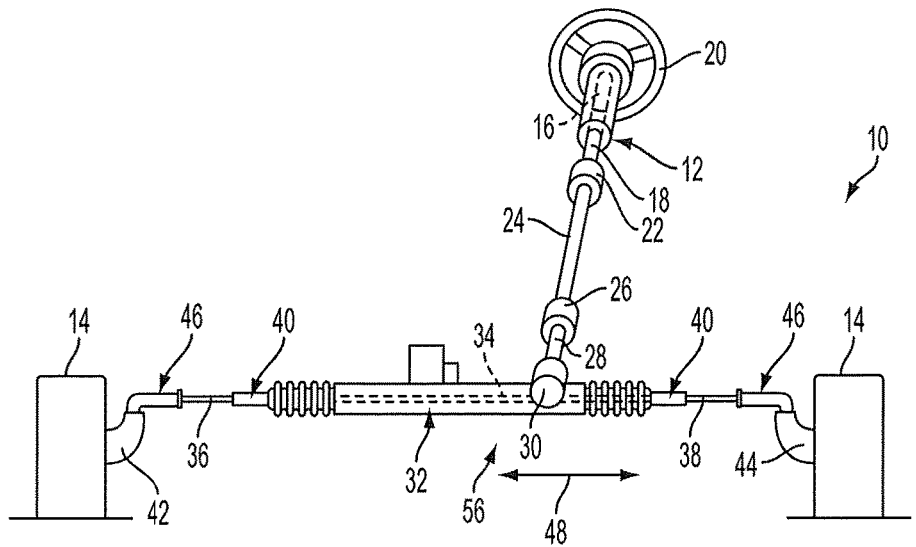
FIG. 1 is a schematic illustration of an exemplary steering system.
Figure 2:
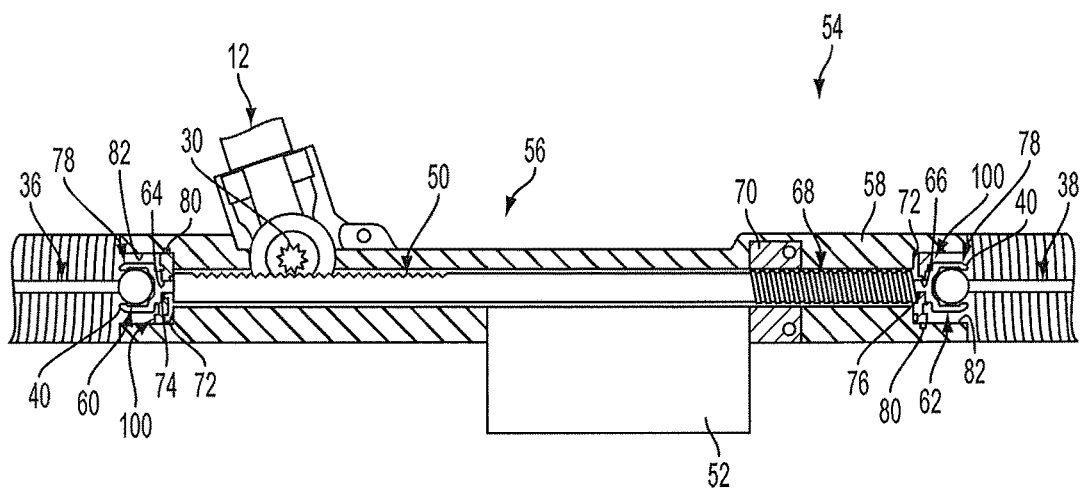
FIG. 2 is a cross-sectional view of an exemplary steering gear assembly that may be used with the steering system shown in FIGS. 1.

Referring now to the Figures, where the invention will be described with reference to specific embodiments, without limiting same, FIGS. 1 and 2 illustrate a steering system 10 for use in a vehicle (not shown). Steering system 10 enables the operator of the vehicle to control the direction of the vehicle through the manipulation of a steering column 12, which is mechanically connected to road wheels 14.

Steering column 12 includes an upper column shaft 16 and a lower column shaft 18. A hand wheel 20 is disposed at upper column shaft 16 and is positioned so that the operator can apply a rotational force to steering column 12. A column universal joint 22 couples lower column shaft 18 to an intermediate shaft 24, which is secured at its other end to a lower column universal joint 26. A pinion shaft 28 is coupled at one end to universal joint 26 and to a pinion gear 30 of a steering gear assembly 32 at the other end. Gear assembly 32 includes an elongate rack 34, and the opposed axial ends of rack 34 are coupled to the vehicle's road wheels 14 through steering linkage that includes tie rods 36, 38 each secured to rack 34 at an inner tie rod end 40, and to a respective steering knuckle 42, 44 at an outer tie rod end 46.

When the vehicle operator turns hand wheel 20, a rotational force is applied to steering column 12 and pinion gear 30 is accordingly rotated. The movement of pinion gear 30 causes axial movement of rack 34 in the direction of arrows 48, which in turn manipulates tie rods 36, 38 and knuckles 42, 44 in order to reposition road wheels 14. Accordingly, when hand wheel 20 is turned, pinion gear 30 and a matching tooth portion 50 (FIG. 2) convert rotary motion of hand wheel 20 into linear motion of rack 34. In order to assist the operator-applied force to steering system 10, a motor 52 (FIG. 2) may be energized to provide power assist to the movement of rack 34, thereby aiding in the steering of the vehicle.

With additional reference to FIG. 2, an exemplary rack electric power steering (REPS) system 54 of steering assembly 10 is illustrated. REPS system 54 includes a rack and pinion steering gear assembly 56 that includes a housing 58 that receives rack 34. Tie rods 36, 38 include respective tie rod joints 60, 62, which are connected to rack 34 via respective internal threads 64, 66. Rack 34 includes a ball screw 68 operatively associated with a ball screw gear box 70, and motor 52 is connected to gear box 70 to provide electric power steering assist for REPS system 54.

A conventional end of travel stop is for each of tie rod joints 60, 62 to strike rack housing 58 at a housing abutment 72. In an impact event such as the vehicle wheel striking a curb, the impact of the tie rod joint striking housing abutment 72 may cause damage such as stripping of rack inner threads 64, 66 and/or respective tie rod joint outer threads 74, 76. Such an impact event may also cause overtravel of gear assembly 32 that may result in disengagement between pinion 30 and rack 34. However, in the exemplary embodiment, steering gear assembly 56 includes end of travel stops 100 circumscribed over or seated over rack 34 and positioned or oriented between housing abutment 72 and tie rod joints 60, 62. As such, during an impact event that transfers a force through tie rods 36, 38 and into gear assembly 56, stops 100 absorb the energy of that force and facilitate preventing overtravel of rack 34.

Figure 3:
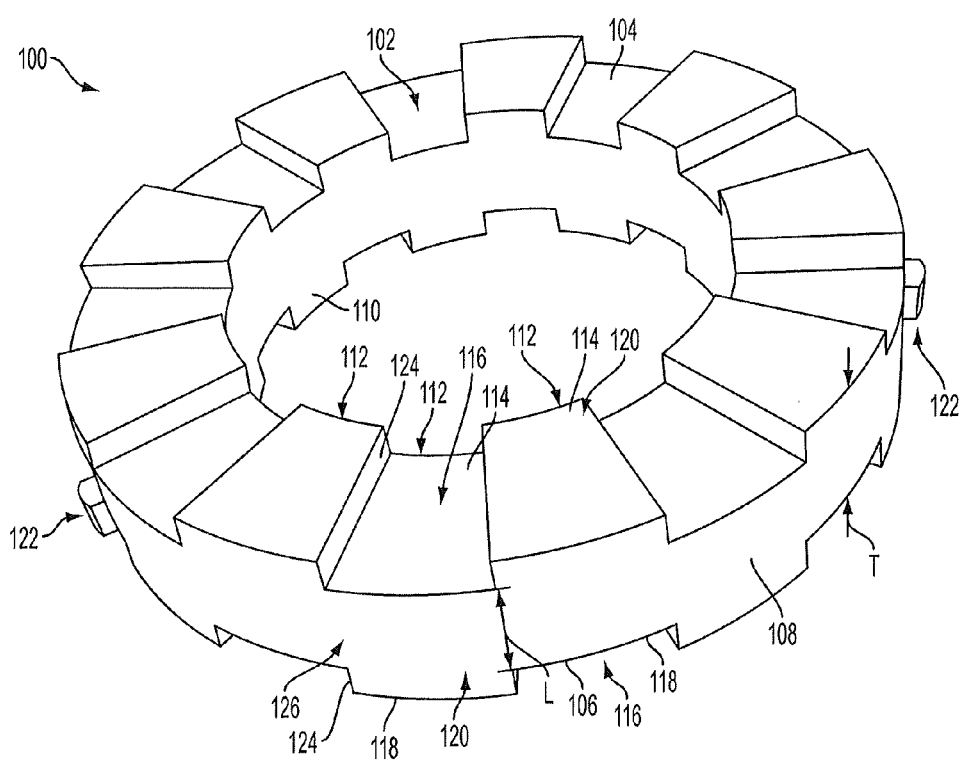
FIG. 3 is a perspective view of an exemplary end of travel stop shown in FIG. 2.

With reference to FIG. 3, end of travel stop 100 includes a generally annular body 102 having a first side 104, a second side 106, an outer diameter 108, and an inner diameter 110. Although illustrated as generally annular, body 102 may have any suitable shape that enables stop 100 to function as described herein. Annular body 102 is formed from a plurality of segments 112 that are alternately off-set with respect to each other such that first and second sides 104, 106 are crenellated. As such, each segment 112 includes a first side 114 that forms a gap or crenel 116 of crenellated sides 104, 106, and a second side 118 that forms a projection or merlon 120 of crenellated sides 104, 106.

Body outer diameter 108 may also include one or more tabs 122 extending therefrom to facilitate seating stop 100 within a bore 78 of housing 58. Corresponding apertures 80 (FIG. 2) may be formed in a wall 82 of bore 78 to receive tabs 122. As such, engagement between tabs 122 and bore wall apertures 80 facilitates securing stop 100 in a desired orientation within housing 58 and preventing dislodging of stop 100 during an impact event.

In the exemplary embodiment, each segment 112 includes sidewalls 124, and the shared sidewalls 124 of adjacent segments 112 define a shear area 126. A length 'L' of shear area 126 (i.e., the amount of material in the shear area) is tunable to vary the force absorption capability of stop 100 and/or the stiffness of stop 100. Force absorption capability facilitates absorbing an impact load or force acting through tie rods 36, 38, and stiffness facilitates controlling a displacement of rack 34 under the impact load. For example, in one embodiment, stop 100 includes a shear area 126 of between approximately 5 mm and 10 mm that results in a force absorption of between approximately 25-75 kN and a rack displacement of between approximately 5mm and 10 mm after impact.

Additionally, a thickness 'T' of each segment 112 is tunable to vary the force absorption capability of stop 100 and/or the stiffness of stop 100, and the number of crenels 116 and merlons 120 making up crenellated sides 104, 106 is tunable to also vary the force absorption capability and/or stiffness of stop 100.

In one embodiment, stop 100 is fabricated from a plastic and plastically deforms during an impact event. In another embodiment, stop 100 is fabricated from an elastic material and elastically (reversibly) deforms during an impact event. In yet another embodiment, stop 100 may be fabricated from a material that elastically deforms at the full travel stop of rack 34, but plastically deforms during an impact event. However, stop 100 may be fabricated from various materials (including different types of a material) to tune or vary the desired force absorption capability of stop 100 and/or the desired stiffness of stop 100.

A method of fabricating end of travel stop 100 includes forming annular body 102 with first and second sides 104, 106. Annular body 102 is formed with alternating off-set or undulating segments 112 that define crenellated surfaces on first and second sides 104, 106. Annular body 102 is formed with off-set segments 112 having a predetermined shear area 126 to facilitate providing a desired force absorption capability and/or stiffness of stop 100. Annular body 102 may be inserted over rack 34 and positioned between housing abutments 72 and tie rod joints 60, 62 such that tab(s) 122 are inserted into corresponding aperture(s) 80, to thereby seat stop 100 within housing bore 78. Additionally, body outer diameter 108 may contact bore wall 82 to further facilitate securing stop 100 in a desired orientation.

Described herein are systems and methods for absorbing impact force and preventing overtravel of components of a steering gear assembly. The systems and methods include an end of travel stop having alternating, off-set segments that define a shear area between adjacent segments. The shear area and other attributes of the travel stop are tunable to vary the force absorbing capability of the stop and/or the stiffness of the stop. This enables the travel stop to be designed for desired impact loads and travel-limit of the assembly rack.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An end of travel stop for a steering gear assembly having a housing, a rack, and a tie rod, the end of travel stop comprising:
an annular body comprising a plurality of segments defining a first crenellated side of the annular body and a second crenellated side of the annular body, each segment includes a first side and a second side that is disposed directly opposite the first side, the first side defines a crenel that extends towards the second side, the second side defines a merlon that projects away from the first side and is disposed directly opposite the crenel, and the stop is circumscribed over the rack and oriented between the housing and the tie rod and arranged to absorb an impact force transferred through the tie rod and to prevent overtravel of the rack, wherein the end of travel stop is arranged to elastically deform and absorb an impact force of between 25 kN and 75 kN from the tie rod and a rack displacement of between 5 mm and 10 mm.

2. The end of travel stop of claim 1, wherein the number of crenels and merlons on the first and second crenellated sides is tunable to facilitate varying a force absorption capability and a stiffness of the travel stop.

3. The end of travel stop of claim 1, wherein the segments of the plurality of segments are offset, adjacent offset segments defining a shear area where sides of the adjacent offset segments are connected, and wherein the shear area is tunable to facilitate varying a force absorption capability and a stiffness of the travel stop.

4. The end of travel stop of claim 1, wherein each segment of the plurality of segments includes an inner surface defining at least a portion of an inner diameter of the annular body, and an outer surface defining at least a portion of an outer diameter of the annular body.

5. The end of travel stop of claim 4, wherein the annular body outer diameter comprises at least one tab configured to be inserted into an aperture of a bore wall of the housing to facilitate seating the travel stop between the housing and the tie rod.

6. The end of travel stop of claim 1, wherein the travel stop is fabricated from plastic.

7. The end of travel stop of claim 1, wherein the travel stop is fabricated from an elastic material.

8. A steering gear assembly comprising:
a housing defining a first bore, a second bore, and a housing abutment extending between the first bore and the second bore, the second bore defining an aperture that is disposed proximate the housing abutment;

a rack received within the first bore of the housing;

a tie rod joint coupled to the rack and received within the second bore; and an end of travel stop circumscribed over the rack and oriented between the housing and the tie rod, the end of travel stop including an annular body comprising a plurality of segments defining a first crenellated side of the annular body and a second crenellated side of the annular body, each segment includes a sidewall that extends between the second crenellated side and the second side, the sidewall of adjacent segments define a shear area having a length between 5 mm and 10 mm, and each segment of the plurality of segments includes an outer surface that includes a tab that extends into the aperture to seat the travel stop between the housing and the tie rod, wherein the end of travel stop is arranged to absorb an impact force of between 25 kN and 75 kN from the tie rod and a rack displacement of between 5 mm and 10 mm.

9. The steering gear assembly of claim 8, wherein each segment includes a first side and a second side, wherein the segments of the plurality of segments are offset such that the segment first side defines a crenel of one of the first and second crenellated sides, and the segment second side defines a merlon of the other of the first and second crenellated sides.

10. The steering gear assembly of claim 9, wherein the number of crenels and merlons on the first and second crenellated sides is tunable to facilitate varying a force absorption capability and a stiffness of the travel stop.

11. The steering gear assembly of claim 8, wherein the segments of the plurality of segments are offset, adjacent offset segments defining a shear area where sides of the adjacent offset segments are connected, and wherein the shear area is tunable to facilitate varying a force absorption capability and a stiffness of the travel stop.

12. The steering gear assembly of claim 8, wherein the travel stop is fabricated from plastic.

13. The steering gear assembly of claim 8, wherein the travel stop is fabricated from an elastic material.

* * * * *